United States Patent [19]

Koike

[11] 4,321,771
[45] Mar. 30, 1982

[54] VEHICLE WINDOW GLASS GUIDING APPARATUS

[75] Inventor: Shoichi Koike, Tokyo, Japan

[73] Assignee: Nissan Motor Co., Ltd., Yokohama, Japan

[21] Appl. No.: 158,533

[22] Filed: Jun. 11, 1980

[30] Foreign Application Priority Data

Jun. 18, 1979 [JP] Japan ............................ 54-77292

[51] Int. Cl.$^3$ .............................................. E05F 11/38
[52] U.S. Cl. ........................................ 49/360; 49/375;
49/452; 49/348
[58] Field of Search .................... 49/227, 348–353,
49/374, 375, 360, 452

[56] References Cited

U.S. PATENT DOCUMENTS 3,591,982  7/1971  Nantau ............................... 49/227
4,051,632 10/1977  Fukumoto ...................... 49/227 X

FOREIGN PATENT DOCUMENTS 868658  5/1961  United Kingdom ................. 49/375

Primary Examiner—Kenneth Downey
Attorney, Agent, or Firm—James C. Wray

[57] ABSTRACT

An apparatus for guiding a lifting or lowering movement of a vehicle window glass (2) has a generally vertical elongate guide track member (3). A hollow lower end (3b) of the guide track member (3) is connected to a panel (P) secured to the vehicle body or a door (D) by a mounting member (10) of one-piece structure. The mounting member is integrally provided with a crosspiece (10d) which formes a bayonet connection with the panel (P), a projection (10b) which is press-fitted into the hollow lower end (3b) of the guide track member (3), and a seal lip (10f) which seals a bore (P$_2$) of the panel (P) through which the crosspiece is passed.

5 Claims, 6 Drawing Figures

VEHICLE WINDOW GLASS GUIDING APPARATUS

The present invention relates to an apparatus for guiding a lifting or lowering movement of a vehicle window glass and more particularly, to an arrangement for mounting a guide track member of such an apparatus.

Conventionally, as shown in FIG. 1, such an apparatus includes a single-arm type window regulator mechanism 1 which is provided with an arm 1a connected to a window glass 2 of a door D or of the vehicle body, and a regulator handle 1b operated to lift or lower the glass 2. The apparatus further includes a tubular guide track member 3 having an upper and a lower ends respectively secured to an inner panel P of the door D or the vehicle body, and a pair of guide elements 4 and 5 which are vertically spaced from each other and secured to a mounting plate 6 through which the regulator arm 1b is connected to the window glass 2. Those guide elements are in sliding contact with the guide track member 3 and define, together with the latter member, the path of the window glass 2 at the time of lifting or lowering the same. Such an apparatus is disclosed, for example, in U.S. Pat. No. 3,591,982.

In the apparatus of the kind mentioned above, as shown in FIGS. 2 and 3, it has been a common practice to connect the lower end 3b of the tubular guide track member 3 with the inner panel P of the door D or vehicle body by means of a mounting bolt 7 having a base portion 7b fixedly secured by calking to the lower end 3a of the member 3, and a threaded portion 7a passed through a bore $P_2$ formed in the bottom wall $P_1$ of the panel P, the threaded portion 7a being engaged by a nut 9 with an annular sealing member 8 between the bottom wall $P_1$ and the nut 9. The above-mentioned connection between the guide track member 3 and the inner panel P encounters the following disadvantages. Namely, since the bolt 7 is connected to the guide track member 3 by calking, and the nut 9 is secured to the bolt 7, the assembling operation is troublesome. As the seal member 8 has to be used, in addition to the fact that the assembly is not easy, the arrangement is relatively costly. Since the lower end of the guide track member 3 directly contacts with the inner panel P, cracks may be formed in the painted layer of the inner panel by which the inner panel is liable to rust. Finally, as the lower end of the guide track member 3 is fixedly connected to the inner panel P by the bolt 7 and nut 9, margine or range of adjusting the position of the upper end 3a of the guide track member 3 longitudinally of the vehicle is not sufficient, and an excessive adjustment of the upper end 3a results in a deformation of the inner panel P.

An object of the present invention is to provide an improved arrangement for mounting the guide track member on the inner panel of the door or the vehicle body without the above-mentioned disadvantages.

According to the present invention, there is provided an apparatus for guiding a lifting or lowering movement of a window glass of a vehicle, including a window regulator mechanism by which the window glass is lifted or lowered, and an elongate guide track member which slidably engages with the window glass and is connected on both end portions with a body or a door of the vehicle with respect to which the window glass is to be lifted or lowered, wherein the lower end of the guide track member is connected to said body or door of the vehicle by a mounting member consisting of resilient material and comprising:

(A) a base portion positioned between the lower end of guide track member and a panel secured to said body or door of the vehicle;

(B) a crosspiece projected radially from a downwardly protruding extension formed on the lower surface of the base portion, which is passed through a correspondingly shaped bore formed in the panel and which is then rotated about the axis of the mounting member to engage with the periphery of the bore;

(C) a projection upwardly protruding from the base portion and fitted into a hollow portion forming said lower end of the guide track member; and (D) a lip seal formed on the periphery of the base portion and resiliently urged against the periphery of the bore on opposite side of the panel which is not in contact with the crosspiece.

The present invention will now be explained in detail by referring to a preferred embodiment shown in the accompanying drawings, in which:

Referring now to FIGS. 4 to 6 which show a preferred embodiment of the present invention, reference numerals used in FIGS. 1 to 3 denote identical or corresponding elements which are not further explained for the sake of simplicity.

Figure 1:
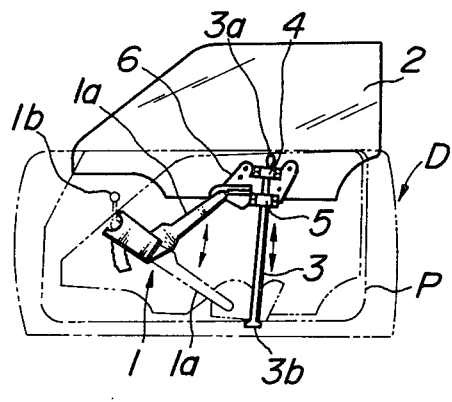
FIG. 1 is a side view showing one example of a conventional apparatus for guiding the vehicle window glass, to which the present invention may be applied.
Figure 2:
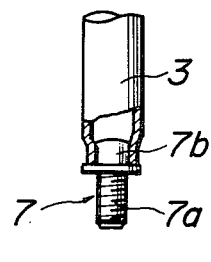
FIG. 2 is a partly-broken side view of the lower end portion of the guide track member with a conventional connecting screw secured thereto.
Figure 3:
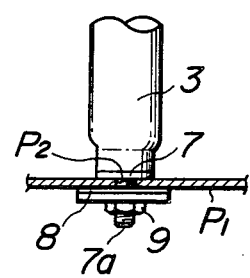
FIG. 3 is a partly-broken side view of the lower end portion of the guide track member shown in FIG. 2, which is connected to the inner panel of a door.
Figure 4:
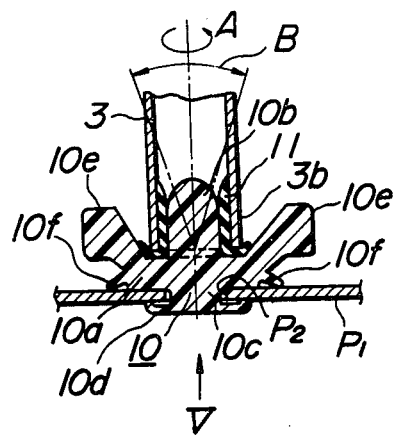
FIG. 4 is a longitudinal-sectional view of the mounting member according to a preferred embodiment of the present invention, which is used to connect the lower end of the guide track member to the inner panel of the door.
Figure 5:
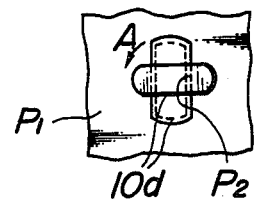
FIG. 5 is an explanatory view as seen in the direction of arrow V in FIG. 4.
Figure 6:
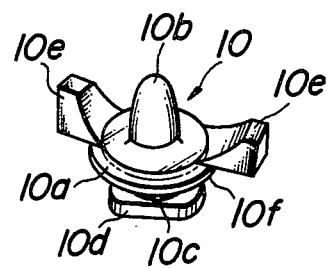
FIG. 6 is a perspective view of the mounting member shown in FIG. 4.

Accordinng to the present invention, the lower end 3b of the guide track member 3 is connected to the door or body of a vehicle, namely to the bottom wall $P_1$ of the inner panel P by means of a bayonet-type mounting member 10 which is made of resilient material, e.g. plastic material or rubber. As shown in FIG. 6, the mounting member 10 includes a generally disc-shaped base portion 10a integrally provided on its upper surface with an upwardly protruding projection 10b in the form of a pin whose diameter is gradually reduced toward the upper end. This projection 10b is press-fitted into the lower end 3b of the tubular guide track member 3 through a sleeve-like insulator 11 made of resilient material. The base portion 10a on its lower surface is provided with a relatively short cylindrical extension 10c which terminates in a crosspiece 10d of generally rectangular cross section (FIG. 5). Corresponding to this crosspiece 10d, the bore $P_2$ of the bottom wall $P_1$ of the inner panel P is so shaped as to conform with the crosspiece such that the crosspiece 10d is passed through the bore $P_2$ in the condition as shown by the broken line in FIG. 5 and then rotated about the axis of the mounting member 10 by 90°, as shown by an arrow A in FIGS. 4 and 5, until the position indicated by the solid line is reached. In such a rotated position, the upper surface of the crosspiece 10d abuts against the periphery of the bore $P_2$ at the lower surface of the bottom wall $P_1$. The mounting member 10 is further provided with a pair of knobs 10e which are radially projected from the upper peripheral edge of the base portion 10a to manually rotate the mounting member 10, and with a sealing lip 10f which is disposed around the lower periphery of the base portion 10a and resiliently urged against the periphery of the bore $P_2$ on the upper surface of bottom wall $P_1$ to completely seal the bore.

With the mounting member 10 of the above-mentioned structure, the guide track member 3 is mounted to the door or vehicle body in the following manner. At first, the mounting member 10 is connected to the inner panel P by passing the crosspiece 10d through the bore $P_2$ and rotating the member 10 by 90° through the knobs 10e. By this, the mounting member 10 is axially fixed due to the engagement between the bottom wall $P_1$ and the crosspiece 10d as well as between the bottom wall $P_1$ and the base portion 10a. As the mounting member 10 consists of resilient material, the sealing lip 10f is elastically deformed and urged against the upper surface of the bottom wall $P_1$ to seal the bore $P_2$. Then, the lower end 3b of the tubular guide track member 3 fitted with the insulator 11 is generally aligned with the projection 10b and pressed down axially. Since the upper end of the projection 10b has a reduced diameter, the guide track member 3 is guided by the side surface of the projection 10b until the position shown in FIG. 4 is reached. In that position, the guide track member 3 is held axially by the resilient force of the insulator 11, and mounted in position.

According to the present invention, the guide track member 3 can be mounted very easily in the manner mentioned above. The mounting member need not be secured to the lower end 3b of the guide track member 3 by calking, nor to the bottom wall of the inner panel P by the bolt 7 and nut 9. Further, the integral sealing lip 10f eliminates a separate seal member 8 while ensuring the required sealing property. Thus, the number of parts and steps of the assembling operation can be greatly reduced.

As the base portion 10a prevents the direct contact of the guide track member 3 with the bottom wall $P_1$ of the inner panel P, the painted layer of the bottom wall is protected from cracks and the bottom wall is substantially free of rust.

As shown by an arrow B in FIG. 4 the guide track member 3 can be oscilated about the mounting member 10 to adjust the position of the upper end 3a of the member 3 longitudinally. Thus, the longitudinal adjustment can be effected for a wide range without deforming the inner panel P.

It will be appreciated that the present invention is not limited to the illustrated embodiment and various modifications may be made without departing from the scope of the present invention. For example, although the cross-sectional shape of the crosspiece 10d has been shown as being rectangular, it may be of any desired shape which can establish the desired bayonet connection. Further, the mounting member 10 may at first be fitted into the lower end 3b of the guide track member 3, and then be connected to the bottom wall of the panel P.

What is claimed is:

1. An apparatus for guiding a lifting or lowering movement of a window glass of a vehicle, including a window regulator mechanism by which the window glass is lifted or lowered, and an elongate guide track member which slidably engages with the window glass and is connected on both end portions with a body or a door of the vehicle with respect to which the window glass is to be lifted or lowered, wherein the lower end of the guide track member is connected to said body or door of the vehicle by a mounting member consisting of resilient material and comprising:
    (A) a base portion positioned between the lower end of the guide track member and a panel secured to said body or door of the vehicle;
    (B) a crosspiece projected radially from a downwardly protruding extension formed on the lower surface of the base portion, which is passed through a correspondingly shaped bore formed in the panel and which is then rotated about the axis of the mounting member to engage with the periphery of the bore;
    (C) a projection upwardly protruding from the base portion and fitted into a hollow portion forming said lower end of the guide track member; and
    (D) a lip seal formed on the periphery of the base portion and resiliently urged against the periphery of the bore on opposite side of the panel which is not in contact with the crosspiece.

2. An apparatus as claimed in claim 1, wherein the guide member further comprises at least one knob projecting radially outwardly from the base portion.

3. An apparatus as claimed in claim 1 or 2, wherein a sleeve-like insulator is arranged between the projection of the mounting member and said hollow end of the guide track member.

4. An apparatus as claimed in claim 3, wherein said insulator consists of resilient material.

5. An apparatus as claimed in claim 1, wherein the cross-sectional shape of the crosspiece is generally rectangular.

* * * * *